United States Patent
Ding et al.

(10) Patent No.: US 12,166,834 B2
(45) Date of Patent: Dec. 10, 2024

(54) SCENE PUSHING METHOD, SCENE IMPLEMENTING METHOD, SCENE PUSHING APPARATUS, SCENE IMPLEMENTING APPARATUS, TERMINAL, SERVER AND SYSTEM

(71) Applicant: Human Horizons (Shanghai) Cloud Computing Technology Co., Ltd., Shanghai (CN)

(72) Inventors: Lei Ding, Shanghai (CN); Xiangyu Ding, Shanghai (CN); Yu Liu, Shanghai (CN); Bing Li, Shanghai (CN); Qiang Shen, Shanghai (CN)

(73) Assignee: Human Horizons (Shanghai) Cloud Computing Technology Co., Ltd., Shanghai (CN)

( * ) Notice: Subject to any disclaimer, the term of this patent is extended or adjusted under 35 U.S.C. 154(b) by 0 days.

(21) Appl. No.: 17/925,569

(22) PCT Filed: Mar. 25, 2021

(86) PCT No.: PCT/CN2021/082970
§ 371 (c)(1),
(2) Date: Nov. 15, 2022

(87) PCT Pub. No.: WO2021/227677
PCT Pub. Date: Nov. 18, 2021

(65) Prior Publication Data
US 2023/0344914 A1    Oct. 26, 2023

(30) Foreign Application Priority Data
May 15, 2020   (CN) .......................... 202010411053.8

(51) Int. Cl.
*H04L 67/55*    (2022.01)
*H04L 67/12*    (2022.01)

(52) U.S. Cl.
CPC .............. *H04L 67/55* (2022.05); *H04L 67/12* (2013.01)

(58) Field of Classification Search
CPC ................................ H04L 67/55; H04L 67/12
See application file for complete search history.

(56) References Cited

U.S. PATENT DOCUMENTS

| | | | |
|---|---|---|---|
| 2010/0222046 A1* | 9/2010 | Cumming | H04M 1/72448 455/418 |
| 2015/0081906 A1* | 3/2015 | Backholm | H04L 67/60 709/225 |

(Continued)

FOREIGN PATENT DOCUMENTS

| | | |
|---|---|---|
| CN | 106599137 A | 4/2017 |
| CN | 107395777 A | 11/2017 |

(Continued)

OTHER PUBLICATIONS

Notification of the First Office Action and Search Report dated Mar. 12, 2021 issued in connection with Chinese Patent Application No. 2020104110538.

(Continued)

*Primary Examiner* — Glenton B Burgess
*Assistant Examiner* — Jihad K Boustany
(74) *Attorney, Agent, or Firm* — Akerman LLP

(57) ABSTRACT

The present disclosure relates to a scene pushing method, a scene implementing method, a scene pushing apparatus, a scene implementing apparatus, a terminal, a server, and a system. The scene pushing method is applied to a management terminal, and comprises: sending a scene query request to a cloud scene server, such that the cloud scene server queries, from a plurality of edited scenes, one or more scenes to be pushed, the edited scenes comprising scenes edited by a mobile terminal or a vehicle-mounted terminal of a first user; receiving said one or more scenes to be pushed (Continued)

returned by the cloud scene server; and screening said one or more scenes to be pushed to obtain a target scene, and pushing the obtained target scene to a target vehicle-mounted terminal, the target vehicle-mounted terminal comprising a vehicle-mounted terminal of a second user. According to the technical solutions of embodiments of the present disclosure, the finely-selected and optimized scene can be pushed to the vehicle-mounted terminal, the user experience is optimized, and an autonomously-set combined scene is automatically triggered quickly and intelligently according to the scene conditions of the vehicle-mounted terminal.

20 Claims, 4 Drawing Sheets

(56) References Cited

U.S. PATENT DOCUMENTS

| | | |
|---|---|---|
| 2016/0368438 A1 | 12/2016 | Qian |
| 2020/0226816 A1* | 7/2020 | Kar ..................... H04N 13/271 |
| 2021/0019946 A1* | 1/2021 | Sonasath ............... G06F 3/0488 |
| 2021/0336937 A1* | 10/2021 | Gao ........................ H04L 67/02 |
| 2023/0037913 A1* | 2/2023 | Shi .......................... G10L 15/22 |

FOREIGN PATENT DOCUMENTS

| | | |
|---|---|---|
| CN | 108507582 A | 9/2018 |
| CN | 108875089 A | 11/2018 |
| CN | 109040317 A | 12/2018 |
| CN | 110300175 A | 10/2019 |
| CN | 111002996 A | 4/2020 |
| CN | 111600952 A | 8/2020 |
| WO | 2017/071251 A1 | 5/2017 |
| WO | 2017/082756 A1 | 5/2017 |

OTHER PUBLICATIONS

Notification on Grant of the Patent Right for Invention and Search Report dated Aug. 18, 2021 issued in connection with Chinese Patent Application No. 2020104110538.
International Search Report dated May 6, 2021 issued in connection with PCT Application No. PCT/CN2021/082970.

* cited by examiner

SCENE PUSHING METHOD, SCENE IMPLEMENTING METHOD, SCENE PUSHING APPARATUS, SCENE IMPLEMENTING APPARATUS, TERMINAL, SERVER AND SYSTEM

CROSS-REFERENCE TO RELATED APPLICATIONS

This application is a national phase of PCT/CN2021/082970, filed Mar. 25, 2021, and claims priority to Chinese Patent Application No. 202010411053.8, filed with the Chinese Patent Office on May 15, 2020 and entitled "Scene Pushing Method, Scene Executing Method, Scene Pushing Apparatus, Scene Executing Apparatus, Terminal, Server and System", the entire contents of both of which are incorporated herein by reference.

TECHNICAL FIELD

The present disclosure relates to the Internet of Vehicles technologies, and in particular to a scene pushing method, a scene executing method, a scene pushing apparatus, a scene executing apparatus, a terminal, a server and a system.

BACKGROUND

During conventional vehicle driving, a user needs to manually set each function, or wake up each function by initiating a voice instruction. However, such a service-acquiring manner during the driving undoubtedly affects the user's safe driving. For this reason, considering the driving safety and constant increase of the user's demands during the vehicle driving, scenes need to be triggered automatically, quickly and intelligently according to ambient conditions. These scenes may be edited by the user. How to preferably share the scenes edited by a plurality of users to improve the users' experience is a problem to be addressed urgently.

SUMMARY

The embodiments of the present disclosure provide a scene pushing method, a scene implementing method, a scene pushing apparatus, a scene implementing apparatus, a terminal, a server and a system to solve the problems existing in the relevant art, by employing the following technical solutions:

In a first aspect, an embodiment of the present disclosure provides a scene pushing method applied to a management terminal, comprising:
  sending a scene query request to a cloud scene server, such that the cloud scene server queries, from multiple edited scenes, one or more scenes to be pushed, the edited scene comprising a scene edited by a mobile terminal or a vehicle-mounted terminal of a first user;
  receiving said one or more scenes to be pushed returned by the cloud scene server;
  screening said one or more scenes to be pushed to obtain a target scene, and pushing the target scene to a target vehicle-mounted terminal, the target vehicle-mounted terminal comprising a vehicle-mounted terminal of a second user.

In a second aspect, an embodiment of the present disclosure provides a scene pushing method applied to a cloud scene server, comprising:
  receiving an edited scene edited by a mobile terminal or a vehicle-mounted terminal of a first user;
  querying, from the multiple edited scenes, one or more scenes to be pushed, in response to receiving a scene query request from a management terminal;
  sending the one or more scenes to be pushed to the management terminal, to enable the management terminal to screen the one or more scenes to be pushed to obtain a target scene, and pushing the target scene to a target vehicle-mounted terminal.

In a third aspect, an embodiment of the present disclosure provides a scene implementing method applied to a vehicle-mounted terminal, comprising:
  receiving a scene pushed by the above scene pushing method;
  implementing the scene.

Advantages or beneficial effects in the technical solutions of embodiments of the present disclosure include: the management terminal screens and filters the edited scenes of partial users to obtain a finely-selected and optimized target scene, and pushes the target scene to other users' vehicle-mounted terminals, thereby implementing the sharing of the finely-selected and optimized scene, and optimizing the user experience; during the driving of the vehicle, the vehicle-mounted terminal may quickly, intelligently and automatically trigger an autonomously-set combined scene according to the scene conditions of the vehicle-mounted terminal, or some finely-selected scenes pushed, thereby improving the driving experience of the vehicle owner as the user. Furthermore, the vehicle-mounted terminal may not interact with the cloud scene server in real time, and the vehicle-mounted terminal may also implement the scene even though the network cannot be communicated.

The above Summary is only intended for illustration purpose, not for limiting in any manner. In addition to illustrative aspects, implementations and features described above, further aspects, implementations and features of the present disclosure are made more apparent with reference to the accompanying drawings and the following detailed depictions.

BRIEF DESCRIPTION OF THE DRAWINGS

In the figures, the same reference numbers throughout a plurality of figures denote the same or like members or elements unless otherwise specified. These figures are not necessarily drawn to scale. It should be appreciated that these figures only depict some embodiments of the present disclosure and should not be construed as limiting the scope of the present disclosure.

DETAILED DESCRIPTION

Only some exemplary embodiments are briefly described below. As a person skilled in the art may realize, the described embodiments may be modified in various different ways without departing from the spirit or scope of the present disclosure. Therefore, the drawings and description are regarded as illustrative and not restrictive in nature.

An embodiment of the present disclosure provides a scene service system, comprising a management terminal, a vehicle-mounted terminal, a cloud and a mobile terminal. The management terminal may be a Personal Computer (PC). The mobile terminal may be an intelligent device such as a mobile phone or a tablet computer. The mobile terminal is installed with an application (APP) for the user to edit scenes. In one example, the vehicle-mounted terminal may be a vehicle-mounted information and entertainment device mounted in the vehicle, and function to achieve information communication between the user and the vehicle and between the vehicle and the external.

Figure 1:
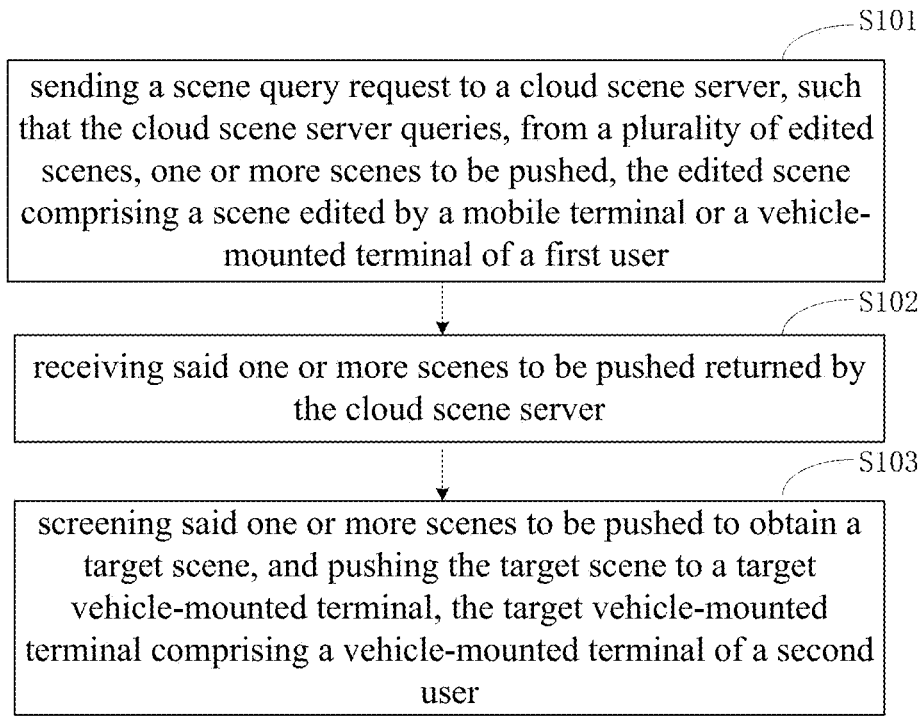
FIG. 1 shows a flow chart of a scene pushing method according to an implementation of an embodiment of the present disclosure.
Figure 2:
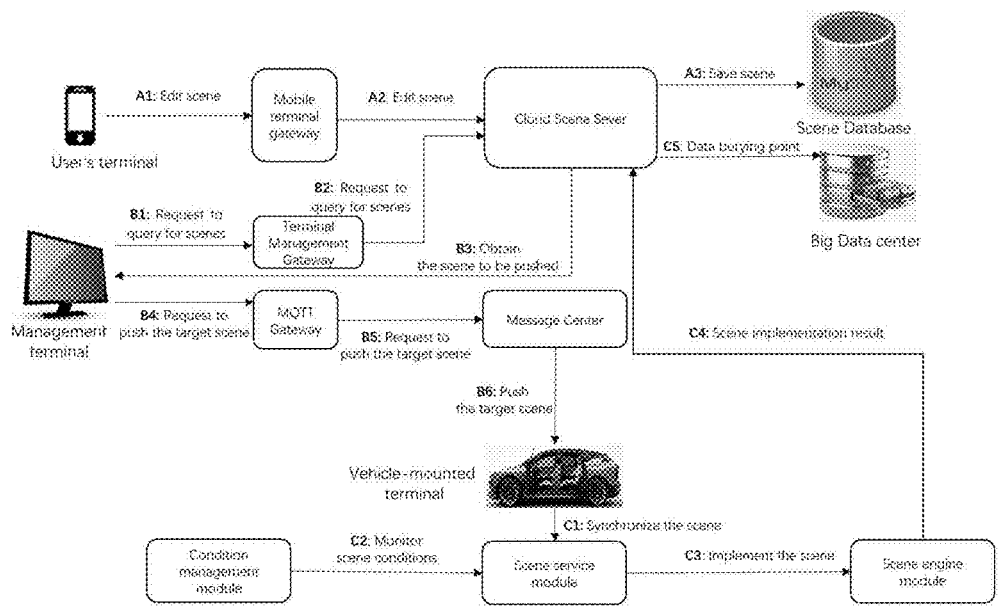
FIG. 2 shows an example diagram of application of a scene service system according to an embodiment of the present disclosure.

FIG. 1 shows a flow chart of a scene pushing method according to an embodiment of the present disclosure. The scene pushing method may be applied to a management terminal. As shown in FIG. 1, the scene pushing method may comprise:

Step S101: sending a scene query request to a cloud scene server, such that the cloud scene server queries, from multiple edited scenes, one or more scenes to be pushed, the edited scene comprising a scene edited by a mobile terminal or a vehicle-mounted terminal of a first user;

In one example, as shown in FIG. 2, each user (including the first user) may edit the scene at his own mobile terminal or vehicle-mounted terminal, and upload the edited scene to a cloud scene server (A1 and A2), and the cloud scene server stores the edited scene to a scene database (A3). The management terminal may send a scene query request to the cloud scene server to request to query for scenes (B1 and B2). The cloud scene server queries, from the scene database, one or more scenes to be pushed, and sends the one or more scenes to be pushed, as a scene query result, to the management terminal (B3).

The scene edited by the user at the mobile terminal may be sent to the cloud scene server after being compiled by a mobile terminal gateway. The scene query request may be sent to the cloud scene server after being compiled by a management terminal gateway, and meanwhile the management terminal gateway compiles the scene query result returned by the cloud scene server, and then send the compiled scene query result to the management terminal.

Step S102: receiving the one or more scenes to be pushed returned by the cloud scene server.

In one example, as shown in FIG. 2, the management terminal may receive the scene query result from the cloud scene server, thereby obtaining the scene to be pushed (B3).

Step S103: screening said one or more scenes to be pushed to obtain a target scene, and pushing the target scene to a target vehicle-mounted terminal, the target vehicle-mounted terminal comprising a vehicle-mounted terminal of a second user.

The management terminal may screen multiple scenes edited by the first user to obtain the target scene, and send the obtained target scene to the vehicle-mounted terminal of the second user, namely, the target vehicle-mounted terminal, to achieve the sharing of the selected scene.

The management terminal may screen the scenes to be pushed obtained from the cloud scene server, according to a preset screening condition. The screening condition may be a logic judgement criterion of the scenes for filtering out some illogic or self-contradictory scenes to be pushed. The screening condition may also be a deduplication condition for filtering out some repeated scenes to be pushed. The screening condition may also be a sensitive word filtering condition for filtering out some scenes to be pushed involving privacy or sensitive words.

In one implementation, step S103 may include: screening the one or more scenes to be pushed to obtain the target scene according to the preset screening condition; sending a scene pushing request to a message center to enable the message center to send the target scene to the target vehicle-mounted terminal.

The message center may be used as a communication medium for sending a message from the management terminal to the vehicle-mounted terminal. In one example, as shown in FIG. 2, the management terminal sends the scene pushing request to the message center, so as to request the message center to push the target scene (B5), and the message center pushes the target scene to a corresponding vehicle-mounted terminal, namely, a target vehicle-mounted terminal (B6).

In one example, the communication between the management terminal and the message center may be based on a Message Queuing Telemetry Transport (MQTT) protocol, namely, the scene pushing request may be sent to the message center after being compiled by the MQTT gateway.

The management terminal may download the scenes to be pushed to a local storage, and upload the target scene obtained from the screening to the message center, to enable the message center to send the target scene to the target vehicle-mounted terminal.

In the technical solution of the embodiment of the present disclosure, the management terminal requests the cloud scene server for scenes edited by partial users, screens and filters the scenes to obtain a finely-selected and optimized target scene, and pushes the target scene to other users' vehicle-mounted terminals, thereby implementing the sharing of the finely-selected and optimized scene, and optimizing the user experience.

In an implementation, the scene query request may include a query condition, for example, a scene implementation rate or a user's comment. In this way, the scenes to be pushed queried by the cloud scene server and matching the query condition may be some scenes with high scene implementation rate or good user's comment. Again for example, the query condition may be user feature information. In this way, the scenes to be pushed queried by the cloud scene server and matching the query condition may be suitable for a certain user group, so that it may be implemented to push those scenes having a certain user feature to the corresponding user group.

In one implementation, before step S101, the method may further include: determining the query condition according to a historical scene implementation result and/or user information from one or more vehicle-mounted terminals.

In one example, after finishing the implementation of the scene, the vehicle-mounted terminal may upload the scene implementation result to the cloud scene server (C4). The cloud scene server is provided with a Big Data center, which collects scene implementation results through a preset data burying point (C5), and analyzes the historical scene implementation results of the respective vehicle-mounted terminal. For example, the scene implementation rate of a certain scene may be obtained as 90% after analysis. When the query condition set by the management terminal is that the scene implementation rate is higher than 70%, the cloud scene server may, after traversing the scene implementation rates of the scenes, return the scene whose implementation rate is 90% to the management terminal as the scene to be pushed.

In addition, the user information of the vehicle-mounted terminal may be uploaded to the cloud scene server. Since each scene has corresponding user information, for example, the user information of the scene-editing user or the user information of the scene-implementing user, the Big Data center collects the user information through the preset data burying point (C5) and analyzes the user information of respective scenes. For example, the user information of the scene-editing user for a scene A is age 31. When the query condition set by the management terminal is that user's age is in range of 30-35, the cloud scene server may, after traversing the user information corresponding to respective scenes, return the scene A to the management terminal as the scene to be pushed.

In one implementation, step S103 may include: determining, from multiple vehicle-mounted vehicles, one or more target vehicle-mounted terminals matching the query condition.

For example, if the query condition is that user's age is in range of 30-35, and the user information of the multiple vehicle-mounted terminals comprises age, then a user's vehicle-mounted terminals, whose age is in the range of 30-35, may be considered as the target vehicle-mounted terminals.

In one implementation, the management terminal may also configure an initial scene and upload the initial scene to the cloud scene server. The cloud scene server stores the initial scene to the scene database (A3), and sends the initial scene to multiple users' vehicle-mounted terminals when the vehicle-mounted terminals start.

For example, in an early stage when the system is put online, there are few scenes edited by the user. The management terminal may pre-configure some initial scenes. The initial scenes are issued by the cloud scene server to respective vehicle-mounted terminals.

In an implementation, the scene includes a scene trigger condition and one or more scene function configurations corresponding to the scene trigger condition. The scene function configuration includes a vehicle-mounted terminal function and a function execution condition corresponding to the vehicle-mounted terminal function.

That is to say, the edited scene or initial scene comprises the scene trigger condition or scene function configuration. In an example, as shown in FIG. 2, after receiving the target scene or the initial scene, the vehicle-mounted terminal may synchronize these scenes to a scene service module (C1) of the vehicle-mounted terminal. A condition management module on the vehicle-mounted terminal monitors a current scene condition (C2) on the vehicle-mounted terminal. When the current scene condition meets the scene trigger condition, the vehicle-mounted terminal implements the scene (C3), i.e., executes the scene function configuration corresponding to the scene trigger condition. Furthermore, the execution of the scene function configuration by the vehicle-mounted terminal may include: the vehicle-mounted terminal parses the scene function configuration corresponding to the scene trigger condition to obtain a target vehicle-mounted terminal function and a target function execution condition; the vehicle-mounted terminal detects whether a vehicle-mounted function component corresponding to the target function execution condition meets the target function execution condition; in response to the vehicle-mounted function component meeting the target function execution condition, the vehicle-mounted terminal calls the vehicle-mounted function component to execute the target vehicle-mounted terminal function.

Figure 3:
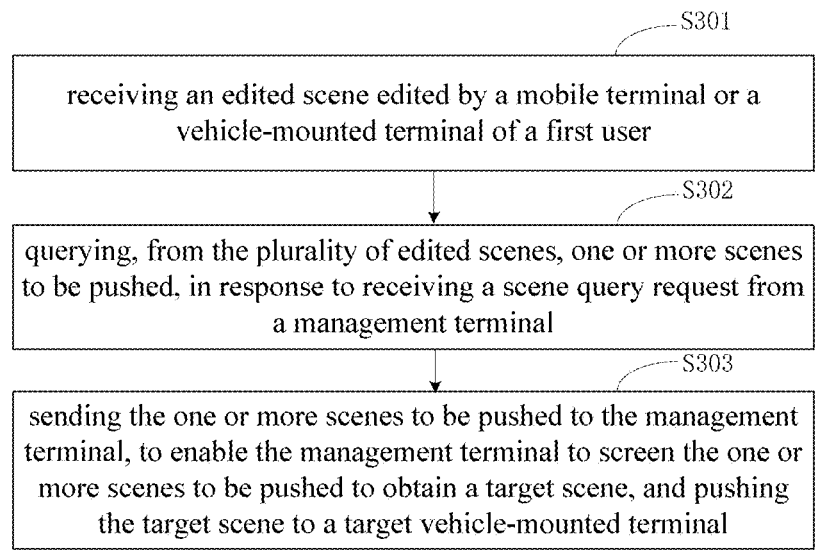
FIG. 3 shows a flow chart of a scene pushing method according to another implementation of an embodiment of the present disclosure.

FIG. 3 shows a flow chart of a scene pushing method according to an embodiment of the present disclosure. The scene pushing method may be applied to a cloud scene server. As shown in FIG. 3, the scene pushing method may include:

Step S301: receiving multiple edited scenes edited by a mobile terminal or a vehicle-mounted terminal of a first user;

Step S302: querying, from multiple edited scenes, one or more scenes to be pushed, in response to receiving a scene query request from a management terminal;

Step S303: sending one or more scenes to be pushed to the management terminal to enable the management terminal to screen the one or more scenes to be pushed to obtain a target scene, and pushes the target scene to a target vehicle-mounted terminal.

In one implementation, the scene query request includes a query condition. Step S301 may comprise: querying, from multiple edited scenes, a scene to be pushed that matches the query condition.

In one implementation, the scene pushing method may further include: receiving an initial scene uploaded by the management terminal; and pushing the initial scene to the vehicle-mounted terminals of multiple users.

In one implementation, the scene pushing method may further comprise: receiving scene implementation results uploaded by the vehicle-mounted terminal; analyzing the scene implementation results according to multiple scene implementation results and preset data burying points, so as to enable the management terminal to determine the query condition of the target scene according to an analysis result.

For the scene pushing method of the cloud scene server, reference may be made to the corresponding depictions of the above-mentioned scene push method of the management terminal. Detailed depictions will not be presented any more.

In one example, the cloud scene server may include: a function library, a scene layout module, a user management module, and a scene service module, wherein the function library is configured to store vehicle-mounted terminal functions and corresponding function execution conditions thereof; the scene layout module is configured to configure a scene trigger condition under each scene and a corresponding scene function configuration; the user management module is configured to manage and maintain user information of the scene-editing users and the scene-implementing users; the scene service module is configured to call corresponding service according to a request of the vehicle-mounted terminal or the management terminal or the mobile terminal.

Figure 4:
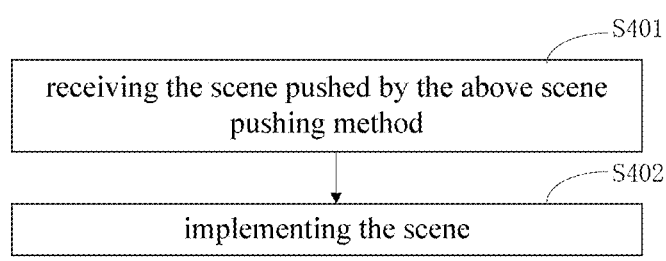
FIG. 4 shows a flow chart of a scene implementing method according to an embodiment of the present disclosure.

FIG. 4 shows a flow chart of a scene execution method according to an embodiment of the present disclosure. The scene execution method may be applied to a vehicle-mounted terminal. As shown in FIG. 4, the scene execution method may include:

Step S401: receiving a scene pushed by the above scene pushing method;

Step S402: implementing the scene.

In this implementation, the scene comprises a scene trigger condition and one or more scene function configurations corresponding to the scene trigger condition. Step S402 may include: monitoring a current scene condition of a vehicle-mounted terminal after receiving the pushed scene; implementing the scene in a case where the current scene condition meets the scene trigger condition.

In one implementation, the scene function configuration includes a vehicle-mounted terminal function and a function execution condition corresponding to the vehicle-mounted terminal function. The implementing the scene in a case where the current scene condition meets the scene trigger condition comprises: parsing the scene function configuration corresponding to the scene trigger condition to obtain a target vehicle-mounted terminal function and a target function execution condition; detecting whether a function component corresponding to the target function execution condition meets the target function execution condition; in response to the function component meeting the target function execution condition, calling the function component to execute the target vehicle-mounted terminal function.

In one implementation, step S402 may include: editing the received scene, and implementing the edited scene. That is to say, after the vehicle-mounted terminal receives the pushed scene, the user may perform an editing operation on the scene such as deleting or amending the scene, save an edited scene to be retained, to a local storage of the vehicle-mounted terminal, and synchronically upload the edited scene to the cloud scene server, thereby sharing the edited scene with vehicle-mounted terminals of other users.

In one implementation, after step S402, the method may include: uploading a scene implementation result of the scene to the cloud scene server.

For the scene execution method of the vehicle-mounted terminal, reference may be made to the corresponding depictions of the above-mentioned scene push method of the management terminal. Detailed depictions will not be presented any more.

Figure 5:
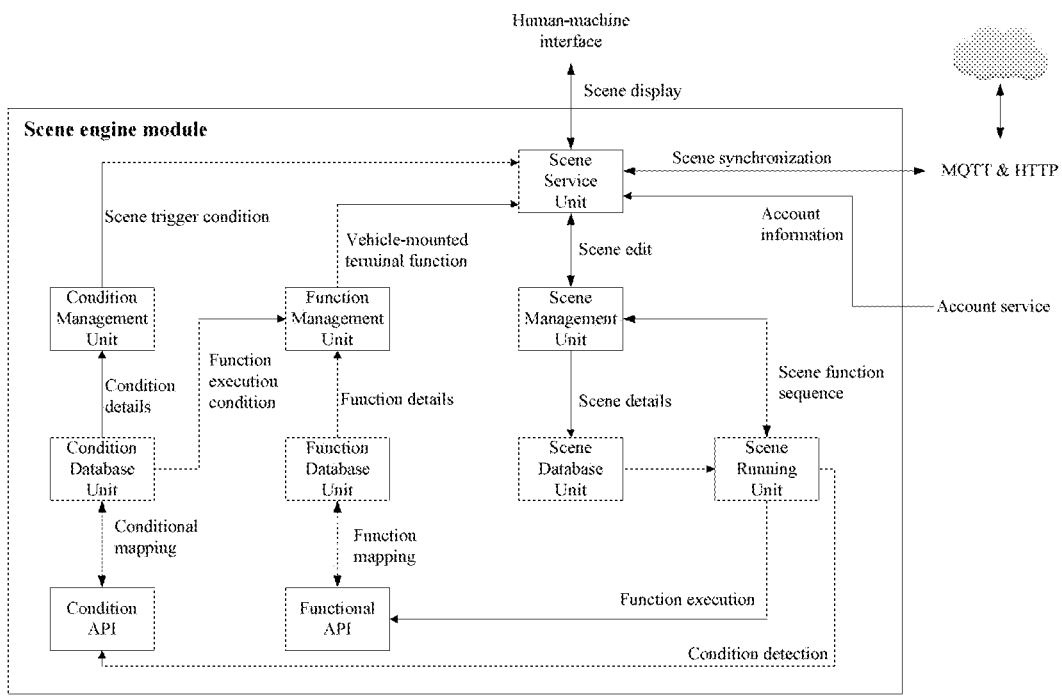
FIG. 5 shows an example diagram of application of a vehicle-mounted terminal according to an embodiment of the present disclosure.

In an example, as shown in FIG. 5, a scene engine module may include: a scene management unit, a scene database unit, a scene running unit, a function database unit, a condition database unit, a condition management unit, a function management unit, a condition API (Application Programming Interface) and a functional API.

The scene service module may receive the target scene pushed by the management terminal from a message center, or may also receive an initial scene from the cloud scene server, and synchronize the target scene or the initial scene to the vehicle-mounted terminal. Furthermore, the scene service module may edit the scene (such as amend or delete the scene), save the edited scene locally to the scene database unit, and synchronize the edited scene to the cloud scene server. The scene management unit parses the scene to obtain a scene function sequence of the scene trigger condition, the vehicle-mounted terminal function and the function execution condition, and the scene function sequence is executed by the scene running unit.

The scene running unit maps the vehicle-mounted terminal function to the function database unit by calling the function API; and maps the function execution condition to the condition database unit by calling the condition API. The function management unit corresponds to APIs of different vehicle-mounted terminal functions with some identities (IDs), and the vehicle-mounted function component matches demanded vehicle-mounted terminal functions through the IDs. Attributes of the vehicle-mounted terminal function comprises name, type, parameter, description information, etc. When a certain vehicle-mounted terminal function needs to be executed, the function management unit may call a corresponding API through the ID, so that the vehicle-mounted functional component corresponding to the ID can realize the demanded vehicle-mounted terminal function.

The condition running unit maps the scene trigger condition and function execution condition to the condition database unit by calling the condition API. The condition management unit also corresponds to the API of the function execution condition with the ID, and the attributes of the function execution condition include name, type, parameter, and the like. When the function execution condition or scene trigger condition needs to be detected, the corresponding API may be called through the ID to detect the condition. When the function execution condition meets the target function execution condition, the function management unit executes the corresponding vehicle-mounted terminal function.

In the technical solution of the embodiments of the present disclosure, during the driving of the vehicle, an autonomously-set combined scene is automatically triggered quickly and intelligently according to the scene conditions of the vehicle-mounted terminal, or some finely-selected scenes may be pushed, thereby improving the driving experience of the vehicle owner as the user. Furthermore, the received scene is not implemented immediately, i.e., the vehicle-mounted terminal does not interact with the cloud scene server in real time, so the execution of the scene is not affected even when the vehicle-mounted terminal has no network connection. In addition, the user may also perform secondary editing on the received scene, and the scene after the secondary editing may be shared with other users.

Figure 6:
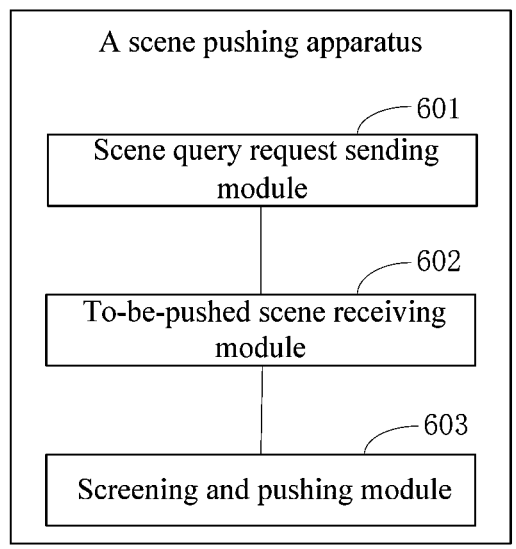
FIG. 6 shows a block diagram of a scene pushing apparatus according to an implementation of an embodiment of the present disclosure.

FIG. 6 shows a scene pushing apparatus according to an embodiment of the present disclosure, applied to the management terminal. The scene pushing apparatus comprises:

a scene query request sending module 601 configured to send a scene query request to a cloud scene server, so as to enable the cloud scene server to query, from multiple edited scenes, one or more scenes to be pushed, the edited scene including a scene edited by a mobile terminal or a vehicle-mounted terminal of a first user;

a to-be-pushed scene receiving module 602 configured to receive the one or more scenes to be pushed returned by the cloud scene server.

a screening and pushing module 603 configured to screen said one or more scenes to be pushed to obtain a target scene, and push the target scene to a target vehicle-mounted terminal, the target vehicle-mounted terminal comprising a vehicle-mounted terminal of a second user.

In an implementation, the screening and pushing module 603 includes:

a screening unit configured to screen said one or more scenes to be pushed to obtain the target scene, according to a preset screening condition;

a pushing unit configured to send a scene pushing request to a message center to enable the message center to send the target scene to the target vehicle-mounted terminal.

In one implementation, the scene query request includes a query condition, for example, a scene implementation rate or good user's comment so as to enable the cloud scene server to query, from multiple edited scenes, a scene to be pushed that matches the query condition.

In one implementation, the screening and pushing module 603 is further configured to determine, from multiple vehicle-mounted vehicles, one or more target vehicle-mounted terminals matching the query condition.

In one implementation, the scene pushing apparatus further includes a query condition determining module configured to determine the query condition according to a historical scene implementation result and/or user information of the one or more vehicle-mounted terminals.

In one implementation, the scene includes a scene trigger condition and one or more scene function configurations corresponding to the scene trigger condition. The scene function configuration comprises a vehicle-mounted terminal function and a function execution condition corresponding to the vehicle-mounted terminal function.

In one implementation, the scene pushing apparatus further includes:
  a configuration module adapted to configure an initial scene;
  an uploading module adapted to upload the initial scene to the cloud scene server to enable the cloud scene server to push the initial scene to vehicle-mounted terminals of multiple users.

Figure 7:
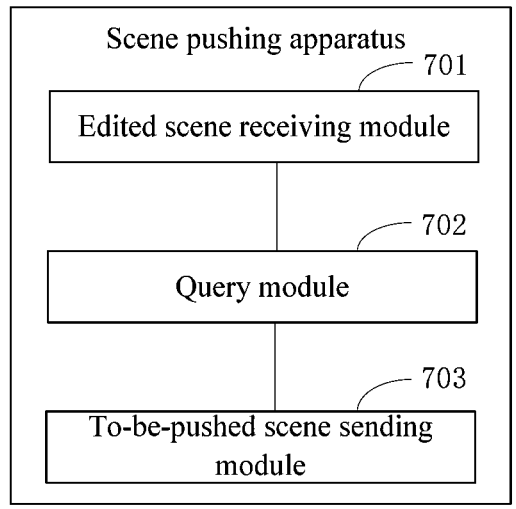
FIG. 7 shows a block diagram of a scene pushing apparatus according to another implementation of an embodiment of the present disclosure.

FIG. 7 shows a scene pushing apparatus according to an embodiment of the present disclosure, applied to the cloud scene server. The scene pushing apparatus includes:
  an edited scene receiving module 701 configured to receive an edited scene edited by a mobile terminal or a vehicle-mounted terminal of a first user;
  a query module 702 configured to query, from multiple edited scenes, one or more scenes to be pushed, in response to receiving a scene query request from a management terminal;
  a to-be-pushed scene sending module 703 configured to send one or more scenes to be pushed to the management terminal, to enable the management terminal to screen the one or more scenes to be pushed to obtain a target scene, and pushes the target scene to a target vehicle-mounted terminal.

In one implementation, the scene query request includes a query condition. The query module 701 is further configured to query, from the multiple edited scenes, a scene to be pushed that matches the query condition.

In one implementation, the scene pushing apparatus may include:
  an initial scene receiving module configured to receive an initial scene uploaded by the management terminal;
  an initial scene pushing module configured to push the initial scene to the vehicle-mounted terminals of the multiple users.

In one implementation, the scene pushing apparatus further comprises:
  a result receiving module configured to receive scene implementation results uploaded by the vehicle-mounted terminals;
  a Big Data analyzing module configured to analyze the scene implementation results according to multiple scene implementation results and preset data burying points, so that the management terminal can determine the query condition of the target scene according to an analysis result.

Figure 8:
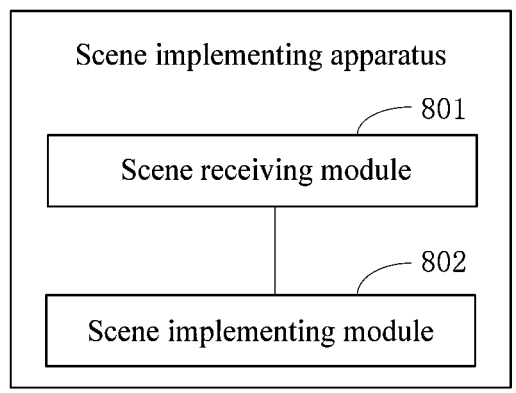
FIG. 8 shows a block diagram of a scene implementing apparatus according to an embodiment of the present disclosure.

FIG. 8 shows a scene implementing apparatus according to an embodiment of the present disclosure, applied to the vehicle-mounted terminal. The scene implementing apparatus includes:
  a scene receiving module 801 configured to receive a scene pushed by the above scene pushing method;
  a scene implementing module 802 configured to implement the scene.

In this implementation, the scene includes a scene trigger condition and one or more scene function configurations corresponding to the scene trigger condition. The scene implementing module 802 comprises:
  a monitoring unit used to monitor a current scene condition of a vehicle-mounted terminal after receiving the pushed scene;
  an implementing unit used to implement the scene in a case where a current scene condition meets the scene trigger condition.

The scene function configuration includes a vehicle-mounted terminal function and a function execution condition corresponding to the vehicle-mounted terminal function. The implementing unit is further configured to parse the scene function configuration corresponding to the scene trigger condition to obtain a target vehicle-mounted terminal function and a target function execution condition, in response to the current scene condition meeting the scene trigger condition; detect whether a function component corresponding to the target function execution condition meets the target function execution condition; in response to the function component meeting the target function execution condition, calling the function component to execute the target vehicle-mounted terminal function.

In one implementation, the scene implementing apparatus further includes: an editing module configured to edit the scene; a scene uploading module configured to upload an edited scene to the cloud scene server; furthermore, the scene implementing module 802 is further configured to implement the edited scene.

In one implementation, the scene implementing apparatus further includes a result uploading module configured to, after implementing the scene, upload a scene implementation result of the scene to the cloud scene server.

Reference may be made to corresponding depictions of the above methods for functions of the modules in the apparatuses in embodiments of the present disclosure. Detailed depictions will not be presented any more.

Figure 9:
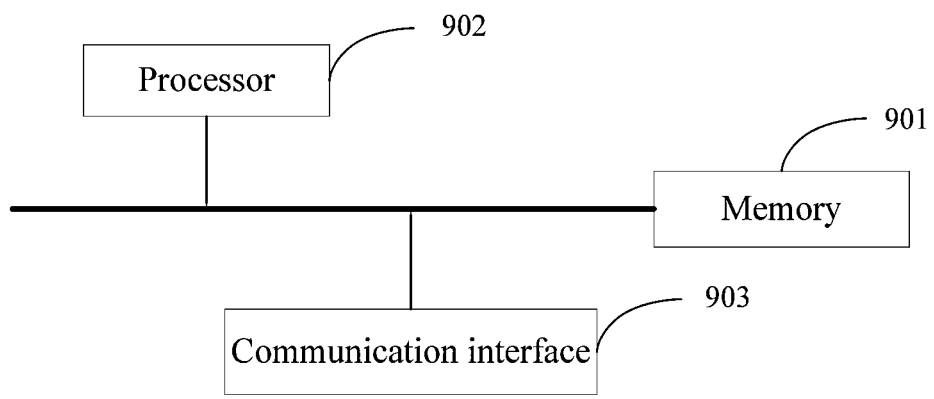
FIG. 9 shows a block diagram of a terminal or server according to an embodiment of the present disclosure.

FIG. 9 shows a block diagram of a management terminal or a cloud scene server or a vehicle-mounted terminal according to an embodiment of the present disclosure. As shown in FIG. 9, the management terminal or the cloud scene server or the vehicle-mounted terminal includes: a memory 901 and a processor 902, wherein instructions that can be executed by the processor 902 are stored in the memory 901. When the processor 902 executes the instructions, any one of the scene pushing methods or the scene implementing methods in the above-mentioned embodiments is implemented. The number of the memory 901 and the processor 902 may be one or more. The terminal or server is intended to represent various forms of digital computers, such as laptop computers, desktop computers, workstations, personal digital assistants, servers, blade servers, mainframe computers, and other suitable computers. The terminal or server may also represent various forms of mobile devices, such as personal digital processors, cellular phones, smart phones, wearable devices, and other similar computing devices. The components shown herein, their connections and relationships, and their functions are by way of example only, and are not intended to limit implementations of the present disclosure described and/or claimed herein.

The terminal or server may further comprise a communication interface 903 for communicating with external devices and performing data interactive transmission. The devices are interconnected using different buses and can be mounted on a common motherboard or mounted in other manners as demanded. The processor 902 may process the instructions executed within the terminal or server, the instructions comprising instructions stored in or on the memory and configured to display graphical information of the GUI on external input/output devices, such as a display device coupled to an interface. In other implementations, multiple processors and/or multiple buses may be used together with multiple memories, if necessary. Likewise, multiple terminals or servers may be connected, with each device providing partial necessary operations, e.g., severing as an array of servers, a group of blade servers, or a multiprocessor system. The buses may be classified into address bus, data bus, control bus and so on. For ease of presentation, the bus is represented only with one thick line in FIG. 9, but this does not mean that there is only one bus or one type of bus.

Optionally, in specific implementation, if the memory 901, the processor 902 and the communication interface 903 are integrated on one chip, the memory 901, the processor 902 and the communication interface 903 may accomplish inter-communication through an internal interface.

It should be understood that the above-mentioned processor may be a Central Processing Unit (CPU), and may also be other general-purpose processors, Digital Signal Processers (DSPs), Application Specific Integrated Circuits (ASICs), Field Programmable Gate Arrays (FPGAs) or other programmable logic devices, discrete gates or transistor logic devices, discrete hardware components, and the like. The general-purpose processor may be a microprocessor or any conventional processor or the like. It is worth noting that the processor may be a processor supporting an Advanced RISC Machines (ARM) architecture.

Embodiments of the present disclosure provide a computer-readable storage medium (such as the above-mentioned memory 901), which stores computer instructions which, when executed by a processor, implement the methods provided in the embodiments of the present disclosure.

Optionally, the memory 901 may include a program-storing region and a data-storing region, wherein the program-storing region may store an operating system, and an application needed by at least one function; the data-storing region may store data created according to the use of the terminal or server. In addition, the memory 901 may comprise high-speed random access memory, and may also comprise a non-transitory memory, such as at least one magnetic disk storage device, a flash memory device, or other non-transitory solid-state storage devices. In some embodiments, the memory 901 may optionally comprise a memory located remotely relative to the processor 902, and these remote memories may be connected to the terminal or server through a network. Examples of the network comprise, but are not limited to, the Internet, an intranet, a local area network, a mobile communication network, and combinations thereof.

The processor 902 may be a first processor, a second processor or a third processor; the memory 901 may be a first memory, a second memory or a third memory.

In the depictions of the specification, depictions referring to terms "one embodiment", "some embodiments", "an example", "a specific example" or "some examples" mean that specific features, structures, materials or characteristics described in the embodiment or example are included in at least one embodiment or example of the present disclosure. Furthermore, the features, structures, materials or characteristics described may be combined in any suitable manner in any one or more embodiments or examples. Furthermore, those skilled in the art may incorporate and combine the different embodiments or examples described in this specification, as well as the features of the different embodiments or examples, without conflicting one another.

In addition, terms "first" and "second" are used for the purpose of description only, and are not to be understood as indicating or implying relative importance or implicitly indicating the number of technical features indicated. Thus, the features defined by "first" or "second" may explicitly or implicitly include one or more of the features. In the description of the present disclosure, "a plurality of" means two or more, unless specifically defined otherwise.

Any description of a process or method in a flowchart or otherwise described herein may be understood to represent including one or more (two or more) modules, segments or portions, such modules, segments or portion are adapted to code with executable instruction for implementing code specific logic functions or steps of the process. Furthermore, the scope of the preferred embodiments of the present disclosure includes alternative implementations in which the functions may be performed out of the order shown or discussed, including performing the functions substantially concurrently or in the reverse order depending upon the functions involved.

The logic and/or steps represented in flowcharts or otherwise described herein, for example, may be considered an ordered listing of executable instructions for implementing the logical functions, may be embodied in any computer-readable medium for use by an instruction execution system, apparatus, or device (for example, a computer-based system, a system including a processor, or other system that can fetch instructions from the instruction execution system, apparatus or device and execute the instructions), or may be used in conjunction with the instruction execution system, apparatus or device.

It should be understood that various parts of the present disclosure may be implemented with hardware, software, firmware, or combinations thereof. In the embodiments described above, various steps or methods may be implemented with software or firmware stored in the memory and executed by a suitable instruction execution system. All or part of the steps of the method in the above-mentioned embodiments may be completed by relevant hardware instructed by a program, and the program may be stored in a computer-readable storage medium. When the program is executed, it includes one of or combinations of the steps of the method embodiments.

In addition, functional units in each embodiment of the present disclosure may be integrated into one processing module, or each unit may exist physically alone, or two or more units may be integrated into one module. The above-mentioned integrated modules may be implemented in the form of either hardware or a software function module. If the integrated module is implemented in the form of the software functional module and sold or used as an independent product, it may also be stored in a computer-readable storage medium. The storage medium may be a read-only memory, a magnetic disk, an optical disk, or the like.

What are described above are only specific implementations of the present disclosure, but the protection scope of the present disclosure is not limited to this. Any person skilled in the art may easily think of variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. A scene pushing method applied to a management terminal, comprising:
    sending a scene query request to a cloud scene server;
    receiving one or more scenes to be pushed, queried from a plurality of edited scenes, returned by the cloud scene server, wherein an edited scene from the plurality of the edited scenes comprises a scene edited by a mobile terminal or a vehicle-mounted terminal of a first user;
    screening said one or more scenes to be pushed to obtain a target scene, and pushing the target scene to a target vehicle-mounted terminal, the target vehicle-mounted terminal comprising a vehicle-mounted terminal of a second user, wherein the target scene comprises a scene trigger condition and a vehicle-mounted terminal function corresponding to the scene trigger condition;
    detecting that a vehicle-mounted function component corresponding to the vehicle-mounted terminal function meets a target function execution condition and, in response to the vehicle-mounted function component meeting the target function execution condition, the vehicle-mounted terminal of the first user calls the corresponding vehicle-mounted function component to execute a target vehicle-mounted terminal function.

2. The scene pushing method according to claim 1, wherein the screening said one or more scenes to be pushed to obtain a target scene, and pushing the target scene to a target vehicle-mounted terminal comprises:
    screening said one or more scenes to be pushed to obtain the target scene, according to a preset screening condition;
    sending a scene pushing request to a message center to enable the message center to send the target scene to the target vehicle-mounted terminal.

3. The scene pushing method according to claim 1, wherein the scene query request comprises a query condition, to enable the cloud scene server to query, from the plurality of edited scenes, a scene to be pushed that matches the query condition.

4. The scene pushing method according to claim 3, wherein the pushing the target scene to a target vehicle-mounted terminal comprises:
    determining, from a plurality of vehicle-mounted vehicles, one or more target vehicle-mounted terminals matching the query condition;
    or, wherein before the sending a scene query request to a cloud scene server, the scene pushing method further comprises:
    determining the query condition according to a historical scene implementation result and/or user information of the one or more vehicle-mounted terminals.

5. The scene pushing method according to claim 1, wherein the scene further comprises one or more scene function configurations corresponding to the scene trigger condition, and wherein the one or more scene function configurations comprise the vehicle-mounted terminal function and a function execution condition corresponding to the vehicle-mounted terminal function;
    or, wherein the scene pushing method further comprises:
    configuring an initial scene;
    uploading the initial scene to the cloud scene server to enable the cloud scene server to push the initial scene to vehicle-mounted terminals of a plurality of users.

6. A scene pushing method applied to a cloud scene server, comprising:
    receiving a plurality of edited scenes edited by a mobile terminal or a vehicle-mounted terminal of a first user;
    querying, from the plurality of edited scenes, one or more scenes to be pushed, in response to receiving a scene query request from a management terminal;
    sending the one or more scenes to be pushed to the management terminal, to enable the management terminal to screen the one or more scenes to be pushed to obtain a target scene, and pushing the target scene to a target vehicle-mounted terminal;
    wherein the target scene comprises a scene trigger condition and a vehicle-mounted terminal function corresponding to the scene trigger condition;
    wherein it is detected that a vehicle-mounted function component corresponding to the vehicle-mounted terminal function meets a target function execution condition and, in response to the vehicle-mounted function component meeting the target function execution condition, the vehicle-mounted terminal of the first user calls the corresponding vehicle-mounted function component to execute a target vehicle-mounted terminal function.

7. The scene pushing method according to claim 6, wherein the scene query request comprises a query condition, and the querying, from the plurality of edited scenes, one or more scenes to be pushed comprises:
    querying, from the multiple edited scenes, a scene to be pushed that matches the query condition.

8. The scene pushing method according to claim 6, further comprising:
    receiving an initial scene uploaded by the management terminal;
    pushing the initial scene to vehicle-mounted terminals of a plurality of users;
    or,
    further comprising:
    receiving a plurality of scene implementation results uploaded by the vehicle-mounted terminal;
    analyzing the plurality of the scene implementation results according to the plurality of scene implementation results and preset data burying points, so as to enable the management terminal to determine the query condition of the target scene according to an analysis result.

9. A scene implementing method applied to a vehicle-mounted terminal, comprising:
    receiving the target scene pushed by the method according to claim 1; wherein the target scene comprises a scene trigger condition and a target vehicle-mounted terminal function corresponding to the scene trigger condition;
    implementing the target scene by calling a target vehicle-mounted function component to implement the target vehicle-mounted terminal function.

10. The scene implementing method according to claim 9, wherein the target scene further comprises a scene function configuration corresponding to the scene trigger condition, the scene function configuration comprises the target vehicle-mounted terminal function, and the implementing the target scene further comprises:

monitoring a current scene condition of the vehicle-mounted terminal after receiving the target scene;

calling the target vehicle-mounted function component to implement the target vehicle-mounted terminal function in a case where the current scene condition meets the scene trigger condition.

11. The scene implementing method according to claim 10, wherein the scene function configuration further comprises a target function execution condition corresponding to the target vehicle-mounted terminal function, and the calling the target vehicle-mounted function component to implement the target vehicle-mounted terminal function in a case where the current scene condition meets the scene trigger condition comprises:

parsing the scene function configuration corresponding to the scene trigger condition to obtain the target vehicle-mounted terminal function and the target function execution condition;

detecting whether the target vehicle-mounted function component meets the target function execution condition;

in response to the target vehicle-mounted function component meeting the target function execution condition, calling the target vehicle-mounted function component to execute the target vehicle-mounted terminal function.

12. The scene implementing method according to claim 9, wherein the method further comprises:

editing the target scene, uploading the edited target scene to a cloud scene server;

the implementing the target scene comprises: implementing the edited target scene;

or, wherein after the implementing the target scene, the method further comprises:

uploading a scene implementation result of the target scene to the cloud scene server.

13. A management terminal, wherein the management terminal comprises:

at least one first processor; and a first memory communicatively connected to the at least one first processor;

wherein, instructions that can be executed by the at least one first processor are stored in the first memory, and the instructions, when executed by the at least one first processor, cause the at least one first processor to perform the method according to claim 1.

14. A cloud scene server, wherein the cloud scene server comprises:

at least one second processor; and a second memory communicatively connected to the at least one second processor;

wherein, instructions that can be executed by the at least one second processor are stored in the second memory, and the instructions, when executed by the at least one second processor, cause the at least one second processor to perform the method according claim 6.

15. A vehicle-mounted terminal, wherein the vehicle-mounted terminal comprises:

at least one third processor; and a third memory communicatively connected to the at least one third processor; wherein, instructions that can be executed by the at least one third processor are stored in the third memory, and the instructions, when executed by the at least one third processor, cause the at least one third processor to perform the method according to claim 9.

16. A scene service system, wherein the scene service system comprises the management terminal according to claim 13, the server according to claim 14 and the vehicle-mounted terminal according to claim 15.

17. A computer-readable storage medium which stores computer instructions which, when executed by a processor, implement the method according to claim 1.

18. A scene pushing apparatus applied to a management terminal, comprising:

at least one processor; and a memory communicatively connected with the at least one processor; wherein the memory stores instructions executable by the at least one processor, and the instructions, when executed by the at least one processor, cause the at least one processor to perform operations of:

sending a scene query request to a cloud scene server;

receiving one or more scenes to be pushed, queried from a plurality of edited scenes, returned by the cloud scene server, wherein an edited scene from the plurality of the edited scenes comprise a scene edited by a mobile terminal or a vehicle-mounted terminal of a first user;

screening said one or more scenes to be pushed to obtain a target scene, and pushing the target scene to a target vehicle-mounted terminal, the target vehicle-mounted terminal comprising a vehicle-mounted terminal of a second user, wherein the target scene comprises a scene trigger condition and a vehicle-mounted terminal function corresponding to the scene trigger condition;

detecting that a vehicle-mounted function component corresponding to the vehicle-mounted terminal function meets a target function execution condition and, in response to the vehicle-mounted function component meeting the target function execution condition, the vehicle-mounted terminal of the first user calls the corresponding vehicle-mounted function component to execute a target vehicle-mounted terminal function.

19. A scene pushing apparatus applied to a cloud scene server, comprising:

at least one processor; and a memory communicatively connected with the at least one processor; wherein the memory stores instructions executable by the at least one processor, and the instructions, when executed by the at least one processor, cause the at least one processor to perform the method according to claim 6.

20. A scene implementing apparatus applied to a vehicle-mounted terminal, comprising:

at least one processor; and a memory communicatively connected with the at least one processor; wherein the memory stores instructions executable by the at least one processor, and the instructions, when executed by the at least one processor, cause the at least one processor to perform operations of:

receiving the target scene pushed by the method according to claim 1; and implementing the target scene.

\* \* \* \* \*